United States Patent
Ogata et al.

(10) Patent No.: US 7,076,353 B2
(45) Date of Patent: Jul. 11, 2006

(54) APPARATUS AND METHOD FOR ACTIVATING OCCUPANT RESTRAINT DEVICE

(75) Inventors: Yoshihisa Ogata, Chiryu (JP); Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 50 days.

(21) Appl. No.: 10/790,032

(22) Filed: Mar. 2, 2004

(65) Prior Publication Data

US 2004/0176893 A1    Sep. 9, 2004

(30) Foreign Application Priority Data

Mar. 4, 2003    (JP) .............................. 2003-057555

(51) Int. Cl.
  B60R 21/0136  (2006.01)
  B60R 21/13    (2006.01)
  B60R 21/16    (2006.01)
(52) U.S. Cl. ........................................ 701/45; 280/735
(58) Field of Classification Search ................. 701/45; 180/268; 280/734, 735, 801.1; 340/440, 340/437
  See application file for complete search history.

(56) References Cited

U.S. PATENT DOCUMENTS 6,282,474 B1 * 8/2001 Chou et al. .................... 701/45
6,438,463 B1 * 8/2002 Tobaru et al. .................. 701/1
6,611,784 B1 * 8/2003 Tobaru et al. ............... 702/151
6,618,655 B1 * 9/2003 Tobaru et al. ................. 701/45
6,856,868 B1 * 2/2005 Le et al. ........................ 701/38
2002/0087235 A1 * 7/2002 Aga et al. ...................... 701/1
2002/0087243 A1 * 7/2002 Sekizuka et al. ............. 701/45

FOREIGN PATENT DOCUMENTS

JP    2001-260780    9/2001

OTHER PUBLICATIONS

U.S. Appl. No. 10/614,902, filed Jul. 9, 2003.

* cited by examiner

*Primary Examiner*—Michael J. Zanelli
(74) *Attorney, Agent, or Firm*—Posz Law Group, PLC

(57) ABSTRACT

An apparatus includes a roll condition detector detecting a roll condition of a vehicle and a lateral acceleration sensor sensing a lateral acceleration of the vehicle. The apparatus also includes a trip-over determination unit determining whether an anticipated rollover of the vehicle has a pattern of trip-over in response to the lateral acceleration and the roll condition of the vehicle, and a trip-over pattern recognition unit recognizing the pattern of trip-over based on the lateral acceleration of the vehicle. The apparatus further includes a rollover determination criteria unit setting a rollover determination criterion depending on the pattern of trip-over, a rollover determination unit determining whether the vehicle will roll over based on the roll condition of the vehicle and the rollover determination criterion, and an activation unit activating occupant restraint devices of the vehicle depending on a result of the rollover determination unit which indicates the vehicle will roll over.

9 Claims, 7 Drawing Sheets

CURBSTONE TRIP-OVER, SUV TRIP-OVER

ROUGH ROAD TRIP-OVER

SANDY PLACE TRIP-OVER

APPARATUS AND METHOD FOR ACTIVATING OCCUPANT RESTRAINT DEVICE

BACKGROUND OF THE INVENTION

1. Technical Field of the Invention

The present invention relates generally to activating an occupant restraint device of a vehicle, and more specifically, to an apparatus and method for determining an anticipated rollover of the vehicle to activate the occupant restraint device of the vehicle.

2. Description of the Related Art

Methods for detecting a roll condition of a vehicle which is indicative of an upcoming rollover of the vehicle have so far been proposed. For example, Japanese Patent Application Laid-Open No. 2001-260780 discloses a method of determining an anticipated rollover of a vehicle.

According to the method, a threshold line is set on a two-dimensional map which uses the roll angle and roll angular rate of the vehicle as parameters, and an anticipated rollover of the vehicle is determined when a history line of the actual roll angle and roll angular rate of the vehicle crosses the threshold line from a non-rollover region to a rollover region, and the results of the determination are then provided to the deployment control of one or more occupant restraint devices of the vehicle such as an air curtain, a side airbag.

There are several patterns of vehicle rollover. Among them, a "curbstone trip-over" is a vehicle rollover which occurs when a vehicle sideslips, and the wheels of either the left or right side of the vehicle collide against curbstones or like obstacles, causing the vehicle to roll over about the collided wheels. Regarding the fact that a lateral (i.e., side-to-side) slip speed of a vehicle prior to collision is high in a curbstone trip-over event, the above-mentioned method adjusts the threshold line to be moved toward the original point of the map in response to the increase of the lateral slip speed of the vehicle to determine an anticipated rollover of the vehicle earlier.

However, the way of adjusting the threshold line may not be suitable for other patterns of vehicle rollover, such as "fall-over". A fall-over is a vehicle rollover which occurs when a vehicle sideslips, and the wheels of either the left or right side of the vehicle slip off a road shoulder, causing the vehicle to roll over. In a fall-over event, even where the lateral slip speed of a vehicle prior to rollover is high, it may be more appropriate to deploy occupant restraint devices of the vehicle such as an air curtain after the roll angle of the vehicle has increased to a certain level of magnitude, so that the occupants of the vehicle are more safely protected from ejection from the vehicle.

Despite the existence of dissimilar patterns of vehicle rollover, the above-mentioned method activates the occupant restraint devices of the vehicle without an accurate recognition of the pattern of an anticipated rollover of the vehicle.

SUMMARY OF THE INVENTION

An object of the present invention is to provide an apparatus and method for activating occupant restraint devices of a vehicle which recognize the pattern of an anticipated rollover of the vehicle accurately, and activate the occupant restraint devices of the vehicle timely based on the recognized pattern of the anticipated rollover of the vehicle.

In accordance with one aspect of the present invention, an apparatus determines an anticipated rollover of a vehicle to activate occupant restraint devices of the vehicle. The apparatus includes a roll condition detector for detecting a roll condition of the vehicle and a lateral acceleration sensor for sensing a lateral acceleration of the vehicle in a width direction of the vehicle. The apparatus also includes a trip-over determination unit determining whether the anticipated rollover of the vehicle has a pattern of trip-over in response to both the lateral acceleration and the roll condition of the vehicle, and a trip-over pattern recognition unit recognizing the pattern of trip-over based on the lateral acceleration of the vehicle when the anticipated rollover of the vehicle has the pattern of trip-over. The apparatus further includes a rollover determination criteria unit setting a rollover determination criterion for the vehicle depending on the recognized pattern of trip-over, a rollover determination unit determining whether the vehicle will roll over based on both the roll condition of the vehicle and the rollover determination criterion for the vehicle, and an activation unit activating the occupant restraint devices of the vehicle depending on a determined result from the rollover determination unit which is indicative of that the vehicle will roll over.

Accordingly, the apparatus can advantageously determine whether the vehicle will roll over based on an accurate recognition of the pattern of the anticipated rollover of the vehicle, so that the occupant restraint devices of the vehicle can be timely activated.

In accordance with another aspect of the present invention, an apparatus determines an anticipated rollover of a vehicle to activate occupant restraint devices of the vehicle. The apparatus recognizes a pattern of trip-over, when the anticipated rollover of the vehicle has the pattern of trip-over, depending on a parameter selected from a set of parameters indicative of characteristics of a lateral acceleration of the vehicle in a width direction of the vehicle. The set of parameters indicative of the characteristics of the lateral acceleration of the vehicle preferably includes a rate of the lateral acceleration of the vehicle in a rising stage thereof, a maximum value of the lateral acceleration of the vehicle, and a length of duration of the lateral acceleration of the vehicle.

In accordance with another aspect of the present invention, an apparatus determines an anticipated rollover of a vehicle to activate occupant restraint devices of the vehicle. The apparatus includes a lateral speed detector for detecting a lateral speed of the vehicle in a width direction of the vehicle, and a rollover determination criteria unit which sets a rollover determination criterion for the vehicle based on the detected lateral speed of the vehicle prior to a rise of a lateral acceleration of the vehicle and a recognized pattern of trip-over when the anticipated rollover of the vehicle has the pattern of trip-over.

Considering the lateral speed of the vehicle prior to the rise of lateral acceleration of the vehicle, the apparatus can determine the anticipated rollover of the vehicle more accurately. In addition, it is preferable for the lateral speed detector to determine the lateral speed of the vehicle prior to the rise of lateral acceleration of the vehicle in terms of an amount of kinetic energy of the vehicle subsequent to the rise of the lateral acceleration of the vehicle, thus saving additional devices such as a speed sensor. Moreover, an improvement can be made to the detection of the lateral speed of the vehicle prior to the rise of lateral acceleration of the vehicle by further factoring in a potential energy of the vehicle subsequent to the rise of the lateral acceleration of the vehicle.

In accordance with yet another aspect of the present invention, a method for activating occupant restraint devices of a vehicle comprises the steps of detecting a roll condition of the vehicle, sensing a lateral acceleration of the vehicle in a width direction of the vehicle, determining whether an anticipated rollover of the vehicle has a pattern of trip-over in response to both the lateral acceleration and the roll condition of the vehicle, recognizing the pattern of trip-over based on the lateral acceleration of the vehicle when the anticipated rollover of the vehicle has the pattern of trip-over, setting a rollover determination criterion for the vehicle depending on the recognized pattern of trip-over, determining whether the vehicle will roll over based on both the roll condition of the vehicle and the rollover determination criterion for the vehicle, and activating the occupant restraint devices of the vehicle depending on a rollover determination result indicative of that the vehicle will roll over.

Accordingly, using the method, it is possible to determine an anticipated rollover of the vehicle accurately, so that the occupant restraint devices of the vehicle can be activated in time.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1A:
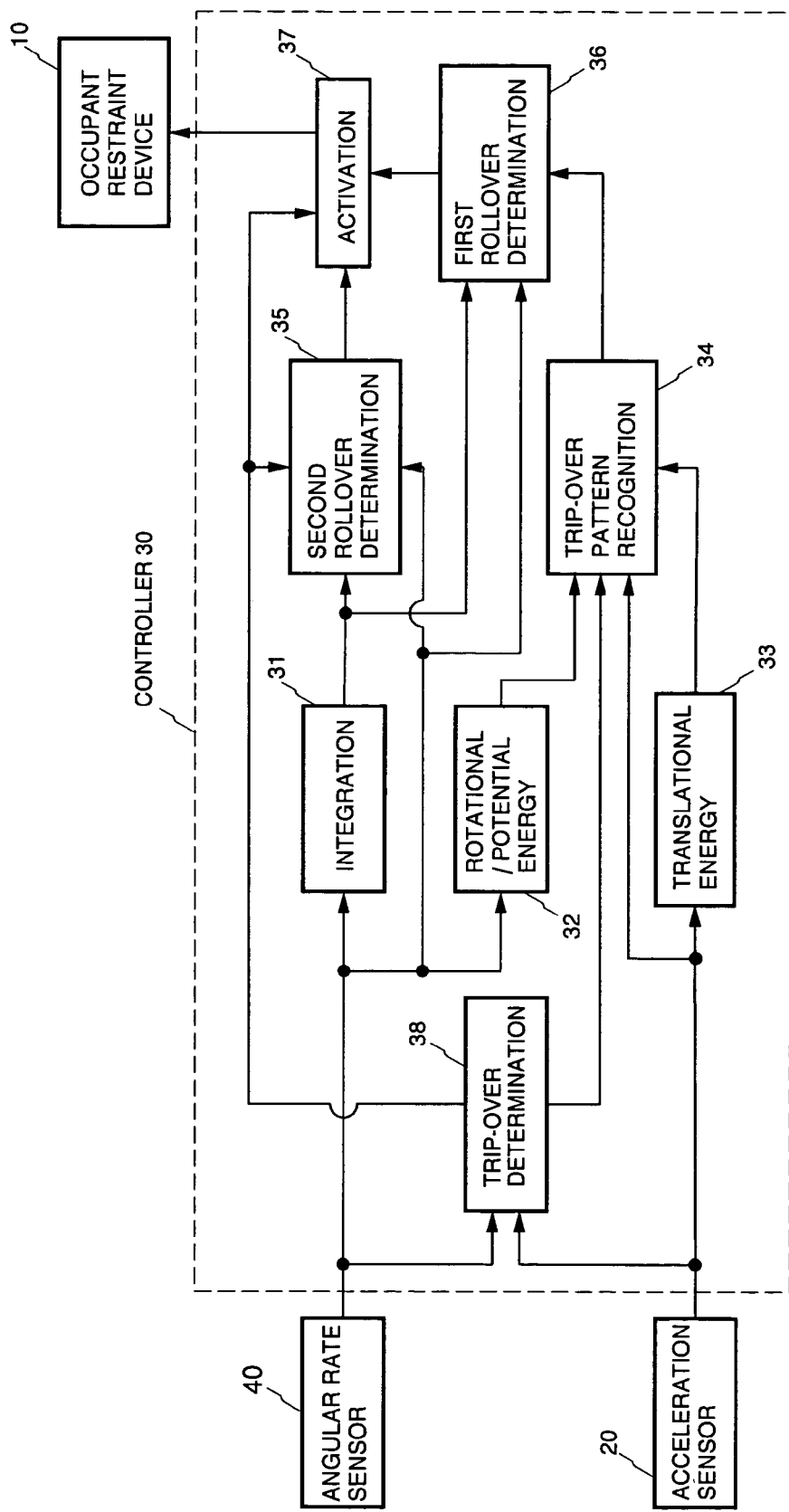
FIG. 1A is a block diagram illustrating a functional configuration of a controller for activating one or more occupant restraint devices of a vehicle in connection with an embodiment of the present invention.

FIG. 1A illustrates an exemplary embodiment of an apparatus for activating one or more occupant restraint devices of a vehicle in accordance with the present invention. As shown in the illustration, the apparatus is provided with an acceleration sensor 20, a controller 30, and an angular rate sensor 40. The controller 30 is further connected to occupant restraint device 10.

The occupant restraint device 10 hereof represents one or more occupant restraint devices of the vehicle such as a pretensioner to reduce slack in a seatbelt, an impact absorption airbag or air curtain which is inflated and deployed around the occupants of the vehicle in the event of a rollover. The occupant restraint device 10 is installed round about the driver's seat and front passenger's seat of the vehicle, and activated upon receiving an actuation command from the controller 30.

The acceleration sensor 20 is a sensor which detects a force acting on the vehicle in a width (i.e., side-to-side) direction of the vehicle, thereby detects an acceleration in the width direction of the vehicle (referred to as lateral acceleration GY hereinafter). The GY signal generated by the acceleration sensor 20 is then provided to the controller 30.

The angular rate sensor 40 is a sensor which detects an angular rate about the front-to-rear axis of the vehicle (referred to as roll angular rate RR hereinafter). Preferably, the angular rate sensor 40 for use is an acceleration sensor detecting a force acting on a curtain amount of mass in response to a rotation, a vibrating structure gyro, or a gas rate gyro. The RR signal generated by the angular rate sensor 40 is provided to the controller 30.

The controller 30 functionally includes a trip-over determination block 38, an integration block 31, a rotational/potential energy block 32, a translational energy block 33, a trip-over pattern recognition block 34, a second rollover determination block 35, a first rollover determination block 36, and an activation block 37.

All the blocks, which are functionally realized in the controller 30, can be configured with either a computer in which necessary components such as I/F, CPU, memories, and clock are placed or a circuitry in which various analog and/or digital circuits are placed. In the case of using the computer, a program installed in a memory functionally realizes the above blocks when the program is activated. On the other hand, In the case of using the circuitry, various circuits are mutually connected to form the above blocks.

The trip-over determination block 38 determines whether an anticipated rollover of the vehicle has a pattern of trip-over or not in response to both the lateral acceleration and the roll condition of the vehicle. More specifically, the pattern of an anticipated rollover of the vehicle is determined as a trip-over when a rise of the lateral acceleration GY of the vehicle is detected, and then or at approximately the same time, a rise of the roll angular rate RR of the vehicle is detected during the rollover event of the vehicle. Otherwise, the pattern of the anticipated rollover is determined as a non-trip-over. In addition, the detection of the rise of the lateral acceleration GY of the vehicle is preferably implemented by checking whether the lateral acceleration GY of the vehicle detected by the acceleration sensor 20 is greater than a predefined value. A signal generated by the trip-over determination block 38, which is indicative of the determination results thereof, is provided to the trip-over pattern determination block 34, the second rollover determination block 35, and the activation block 37 simultaneously.

Figure 5:
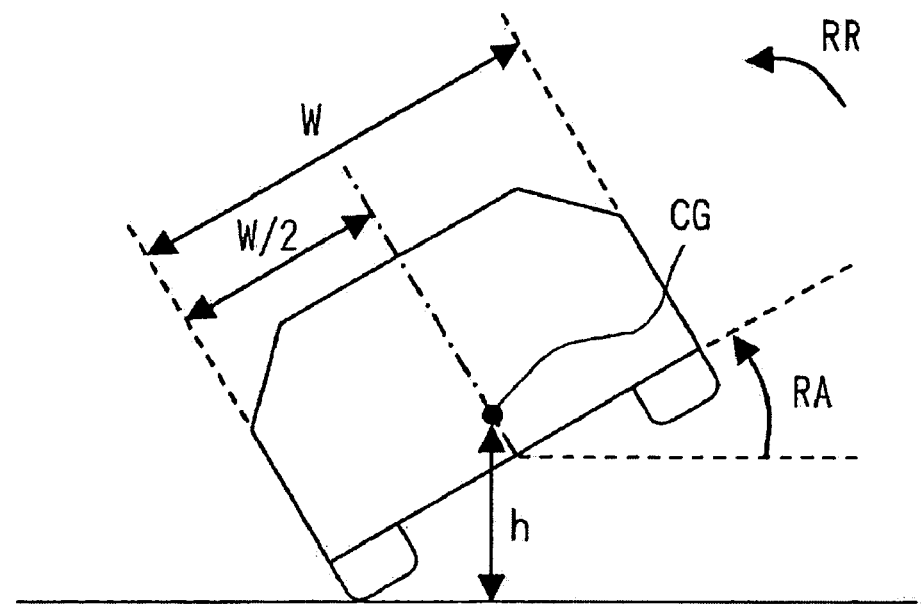
FIG. 5 is a simplified end view illustrating a roll condition of a vehicle in connection with the embodiment of the present invention.

The integration block 31 integrates the roll angular rate RR of the vehicle provided by the angular rate sensor 40 to calculate a rotation angle about the front-to-rear axis of the vehicle as shown in FIG. 5 (referred to as roll angle RA hereinafter). The roll angle RA of the vehicle can, for example, be determined by the following equation:

$$RA = \int RR \cdot dt \qquad \text{(Equation 1)}$$

The roll angle RA of the vehicle can also be directly detected by using an additional roll angle sensor, however, the use of the additional roll angle sensor may result in an increase of cost.

The rotational/potential energy block 32 calculates a rotational energy Tr of the vehicle about the front-to-rear axis of the vehicle with the roll angular rate RR of the vehicle provided by the angular rate sensor 40. The rotational energy Tr can, for example, be determined by the following equation:

$$Tr = Ir \times (RR)^2 / 2 \qquad \text{(Equation 2),}$$

where Ir is the predetermined moment of inertia of the vehicle with respect to the rotation center of the vehicle.

Furthermore, the rotational/potential energy block 32 calculates a potential energy Tp of the vehicle generated due to the rollover condition of the vehicle. The potential energy Tp can, for example, be determined by the following equation:

$$Tp = m \times g \times h \qquad \text{(Equation 3),}$$

where m is the mass of the vehicle, g is the gravitational constant, and h is the height of the center of gravity (CG) of the vehicle as shown in FIG. 5.

The calculated potential energy Tp is then provided to the trip-over pattern recognition block 34. In addition, h in the above equation 3 can, for example, be predetermined by the following equation:

$$h = W \times \sin(RA)/2 \qquad \text{(Equation 4),}$$

where RA is the roll angle of the vehicle calculated by the integration block 31, and W is the width of the vehicle as shown in FIG. 5.

The translational energy block 33 calculates a translational energy Tv of the vehicle in the width direction of the vehicle with the lateral acceleration GY of the vehicle provided by the acceleration sensor 20. The translational energy Tv of the vehicle can, for example, be determined by the following equation:

$$Tv = m \times (\int GY \cdot dt)^2 / 2 \qquad \text{(Equation 5)}$$

The calculated translational energy Tv of the vehicle is then provided to the trip-over pattern recognition block 34. In addition, the integration term in the above equation 5 can be applied to the following equation:

$$Vb = Va - \int GY \cdot dt \qquad \text{(Equation 6),}$$

where Vb is a lateral slip speed of the vehicle which has risen in the width direction of the vehicle immediately prior to a rise of lateral acceleration GY of the vehicle in a trip-over event of the vehicle (referred to as lateral slip speed Vb prior to trip hereinafter), and Va is a lateral slip speed of the vehicle which has developed in the width direction of the vehicle immediately subsequent to the rise of lateral acceleration GY of the vehicle in the trip-over event of the vehicle (referred to as lateral slip speed Va subsequent to trip hereinafter).

The trip-over pattern recognition block 34 recognizes a pattern of trip-over upon receiving a signal from the trip-over determination block 38 which indicates that an anticipated rollover of the vehicle has the pattern of trip-over.

Figure 1B:
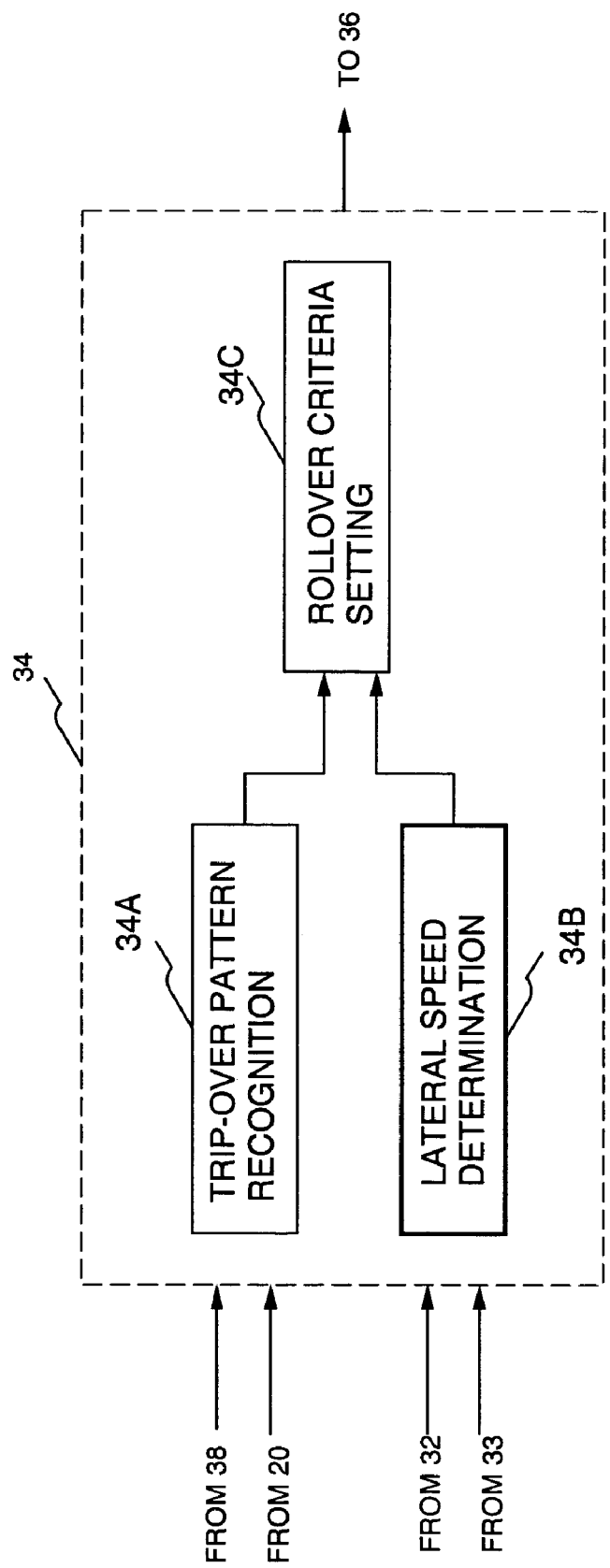
FIG. 1B is a block diagram illustrating a detailed functional configuration of the trip-over pattern recognition block of FIG. 1A in connection with the embodiment of the present invention.

Referring to FIG. 1B, the trip-over pattern recognition block 34 further includes a trip-over pattern recognition sub-block 34A, a lateral speed determination sub-block 34B, and a rollover criteria setting sub-block 34C.

First, the trip-over pattern recognition sub-block 34A recognizes the pattern of trip-over depending on a parameter selected from a set of parameters indicative of characteristics of the lateral acceleration GY of the vehicle.

Figure 6:
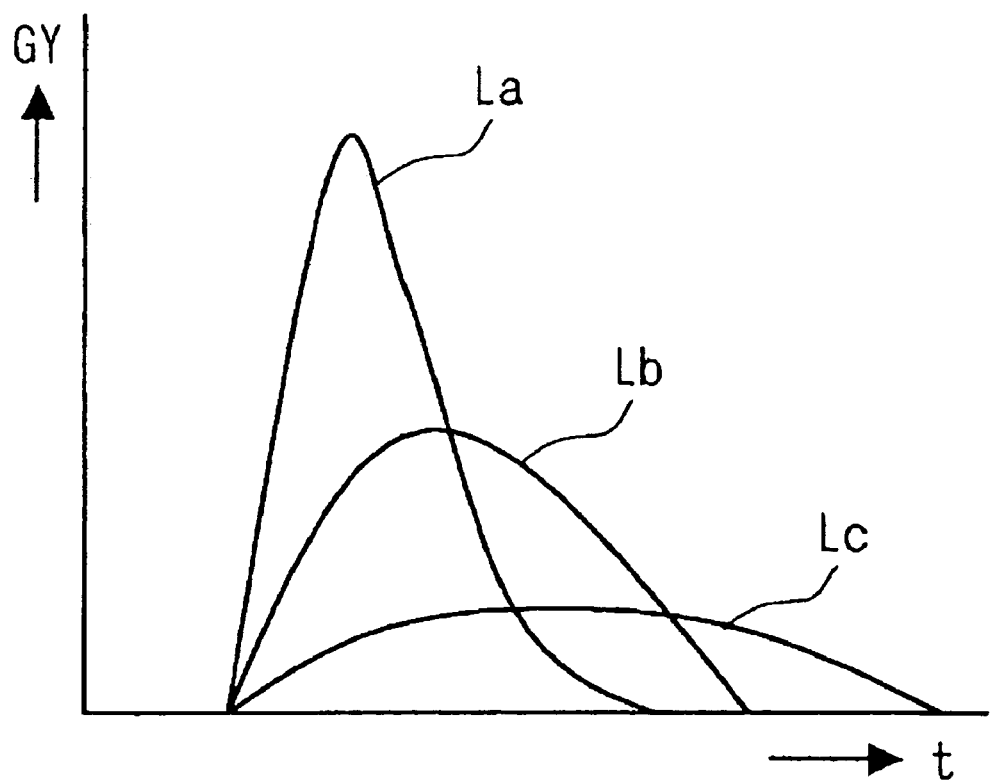
FIG. 6 is a simplified graphical representation showing characteristics of a lateral acceleration of a vehicle with respect to each pattern of trip-over in connection with the embodiment of the present invention.

By way of example, in a curbstone trip-over event, a high lateral acceleration GY of the vehicle as the curve La of FIG. 6 rises rapidly when the vehicle sideslips, causing a collision against curbstone-like obstacles with high rigidity. And the duration of the high lateral acceleration GY of the vehicle is very short, in other words, a high lateral acceleration GY of the vehicle in the form of a pulse-wave rises in a curbstone trip-over event of the vehicle. The wheels which collided against the curbstone-like obstacles hardly further sideslip, causing the vehicle to roll over about the collided wheels at a high roll angular rate RR.

Similarly, such a lateral acceleration GY of the vehicle in the form of a pulse-wave rises in a rollover event of the vehicle having the pattern of "SUV trip-over". A SUV trip-over is a vehicle rollover which occurs when a vehicle having a high vehicle height, such as a SUV (Sports Utility Vehicles), impacts a side portion of another vehicle at reset, causing the impacted vehicle to roll over about the own wheels of the opposite side against the impact.

More specifically, for the vehicle in a SUV trip-over event where the vehicle is impacted, the wheels of the vehicle of the opposite side against the impact sideslip in the width direction of the vehicle while the lateral acceleration GY of the vehicle as described above rises, resulting in the trip-over thereof at a high roll angular rate RR at the place where the side-slip of the vehicle ends.

In comparison with the lateral accelerations rising in the vehicle rollover events having the pattern of curbstone trip-over or SUV trip-over, a lower lateral acceleration GY of the vehicle as the curve Lb of FIG. 6 rises slowly in a rollover event of the vehicle having the pattern of a "rough road trip-over". A rough road trip-over is a rollover which occurs when a vehicle sideslips, and the wheels of either the left or right side of the vehicle slip into a road with a rough surface, causing the vehicle to roll over about the wheels which slipped into the rough road in first.

More specifically, in a rough road trip-over event, a lateral acceleration GY of the vehicle rises when the wheels of the vehicle first slipped into the rough road, and goes on for a certain duration. Furthermore, the wheels which slipped into the rough road in first continues the side-slip in the width direction of the vehicle while the lateral acceleration GY of the vehicle develops, resulting in the trip-over thereof at a low roll angular rate RR at the place where the side-slip ends.

Moreover, an even lower lateral acceleration GY as the curve Lc of FIG. 6 rises even slowly in a rollover event of the vehicle having the pattern of "sandy place trip-over", compared to that of the pattern of rough road trip-over. A sandy place trip-over is a vehicle rollover which occurs when a vehicle sideslips, and the wheels of either the left or right side of the vehicle slip into a sandy place, causing the vehicle to roll over about the wheels which slipped into the sandy place in first.

More specifically, in a sandy place trip-over event, a lateral acceleration GY of the vehicle rises when the wheels of the vehicle first slipped into the sandy place, and goes on for a longer duration compared to that of the pattern of rough road trip-over. Furthermore, the wheels which slipped into the sandy place in first experience a long distance of side-slip in the width direction of the vehicle while the lateral acceleration GY of the vehicle develops, resulting in the trip-over thereof at an even lower roll angular rate RR at the place where the side-slip ends.

Accordingly, the pattern of trip-over, which an anticipated rollover of the vehicle has, can be recognized as curbstone trip-over, SUV trip-over, rough road trip-over, or sandy place trip-over, depending on the characteristics of the lateral acceleration GY of the vehicle which rises in the anticipated rollover event. And recognizing the pattern of trip-over, it is possible to determine the anticipated rollover condition of the vehicle in advance including that the vehicle rolls over at a high, or low roll angular rate RR.

As to the way of recognizing the pattern of trip-over, a recognition can be made depending on one or more parameters selected from a parameter set indicative of the characteristics of the lateral acceleration GY of the vehicle. The set of parameters preferably includes a rate of the lateral acceleration of the vehicle in a rising stage thereof, a maximum value of the lateral acceleration of the vehicle, and a length of duration of the lateral acceleration of the vehicle.

Secondly, the lateral speed determination sub-block 34B of FIG. 1B calculates the lateral slip speed Vb prior to trip with the calculation results of Tr, Tp, and Tv from the rotational/potential energy block 32 and the translational energy block 33 by the following equation:

$$Vb = (Dv/2) + (Tr/m \times Dv) + (Tp/m \times Dv) \quad \text{(Equation 7)}$$

Generally, in a vehicle roll over event having a pattern of trip-over, if the lateral slip speed Vb of the vehicle prior to trip is high, the vehicle is then considered to roll over at a high roll angular rate RR excepting the case that the trip-over is a SUV trip-over. Therefore, considering the lateral slip speed Vb of the vehicle prior to trip, it becomes possible to determine an anticipated rollover of the vehicle more accurately.

Finally, the rollover criteria setting sub-block 34C of FIG. 1B sets a rollover determination criterion for the vehicle depending on the recognized pattern of trip-over and the lateral slip speed Vb of the vehicle prior to trip. As an example, the rollover criteria setting sub-block 34C selects the optimal threshold line on the map of the first rollover determination block 36 to be described below depending on the recognized pattern of trip-over and the lateral slip speed Vb of the vehicle prior to trip.

Figure 4:
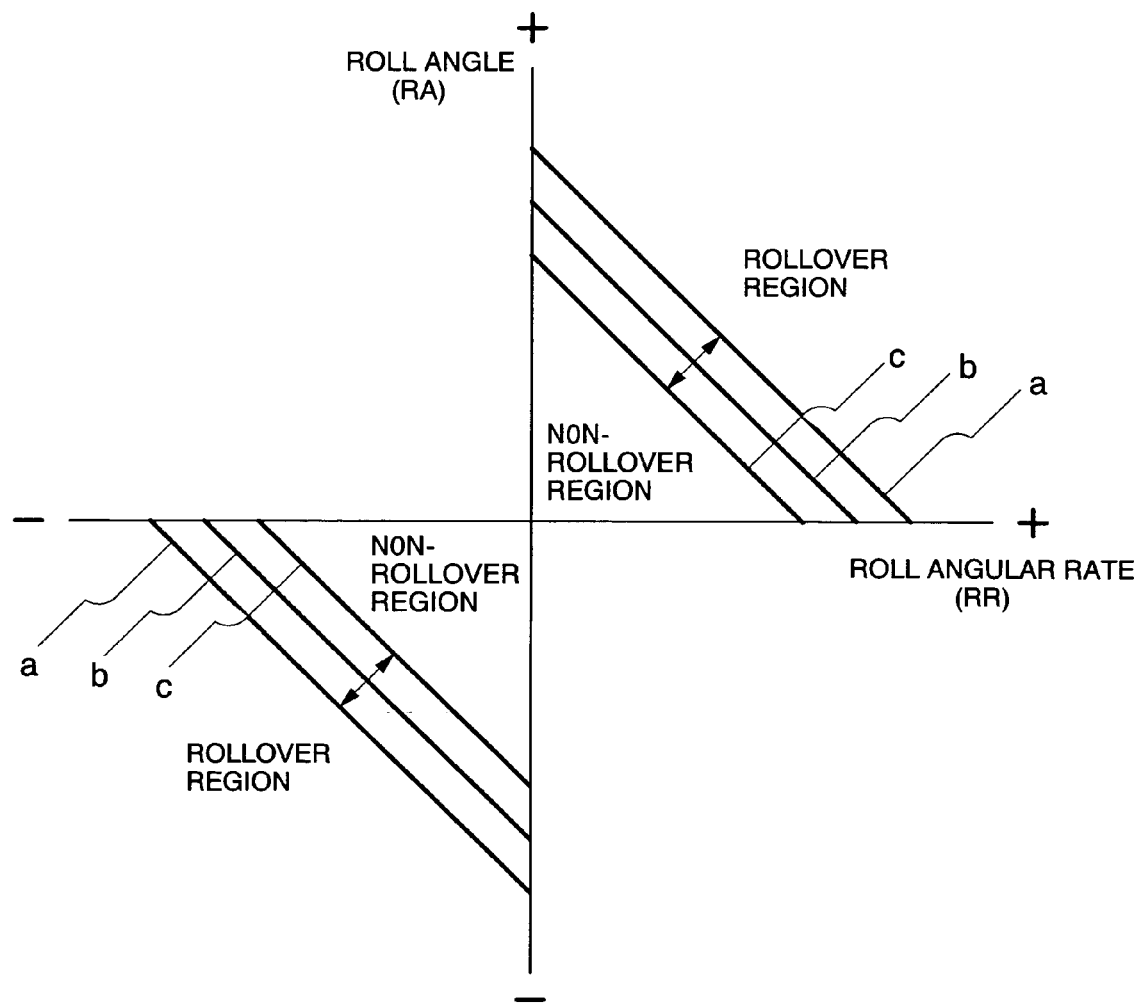
FIG. 4 is a map indicating a relationship between the roll angle and roll angular rate of a vehicle in connection with the embodiment of the present invention.

The first rollover determination block 36 determines an anticipated rollover of the vehicle, which has a pattern of trip-over, depending on the roll angle RA and roll angular rate RR of the vehicle. The first rollover determination block 36 has a map as shown in FIG. 4, which indicates a relationship between the roll angle RA and roll angular rate RR of the vehicle. And as seen from FIG. 4, there are a rollover region and a non-rollover region on the map. The first rollover determination block 36 determines whether the vehicle will roll over depending on the region where the point representing the actual values of the roll angle RA and roll angular rate RR of the vehicle falls. More specifically, when the point falls on the rollover region, the vehicle is then determined will roll over, otherwise is will not roll over.

Furthermore, the regions of rollover and non-rollover on the map are separated by a threshold line. For example, there are three threshold lines a, b, and c on the map of FIG. 4, and only one optimal threshold line is selected by the rollover criteria setting sub-block 34C described above.

Figure 7A:
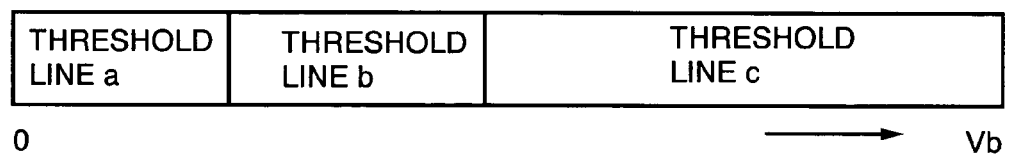
FIG. 7A is a map used for determining an anticipated rollover of a vehicle having the pattern of curbstone trip-over or "SUV trip-over" (to be described below) in connection with the embodiment of the present invention.
Figure 7B:
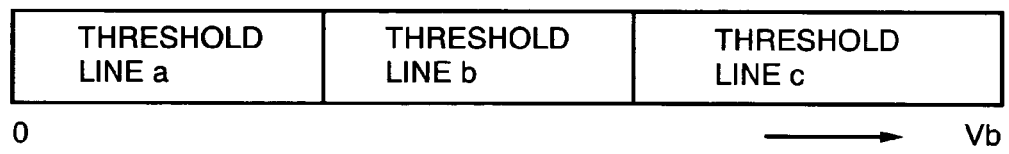
FIG. 7B is a map used for determining an anticipated rollover of a vehicle having the pattern of "rough road trip-over" (to be described below) in connection with the embodiment of the present invention.
Figure 7C:
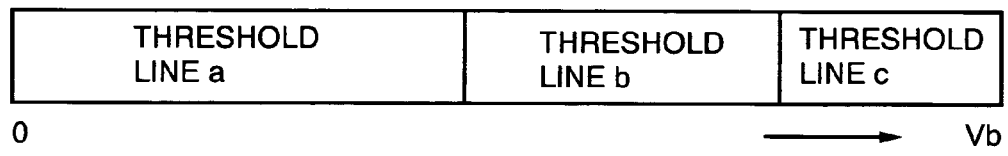
FIG. 7C is a map used for determining an anticipated rollover of a vehicle having the pattern of "sandy place trip-over" (to be described below) in connection with the embodiment of the present invention.

The rollover criteria setting sub-block 34C has three maps with respect to each pattern of trip-over, as shown in FIG. 7A, FIG. 7B, and FIG. 7C respectively. The rollover criteria setting sub-block 34C first selects a map from the three maps depending on the recognized pattern of trip-over which an anticipated rollover of the vehicle has, and then selects a corresponding threshold line from the lines a, b, and c depending on the determined lateral slip speed Vb of the vehicle prior to trip. The determination result is then provided to the first rollover determination block 36.

More specifically, as shown in FIG. 7A, in the event that an anticipated rollover of the vehicle has a pattern of curbstone trip-over or SUV trip-over where the vehicle rolls over at high roll angular rate RR, the Vb intervals assigned to the threshold lines b, and c are set long, so that the anticipated rollover of the vehicle can be determined at an early stage. On the contrary, as shown in FIG. 7C, in the event that an anticipated rollover of the vehicle has a pattern of sandy place trip-over where the vehicle rolls over at low roll angular rate RR, the Vb interval assigned to the threshold line a is set long, so that the rollover condition of the vehicle can be determined at an appropriate stage.

According to the embodiment of the present invention, the lateral slip speed Vb of the vehicle prior to trip is calculated in advance, and the optimal threshold line on the map of the first rollover determination block 36 is selected depending on the recognized pattern of trip-over and the lateral slip speed Vb prior to trip. However, the optimal threshold line on the map of the first rollover determination block 36 can be selected depending solely on the pattern of trip-over.

Referring again to FIG. 1A, the controller 30 has the second rollover determination block 35 which determines an anticipated rollover of the vehicle upon receiving a signal from the trip-over determination block 38 which indicates that the anticipated rollover of the vehicle has a pattern of non-trip-over.

The second rollover determination block 35 determines the anticipated rollover of the vehicle depending on the roll angel RA and roll angular rate RR of the vehicle. It has a map identical to that of the first rollover determination block 36, and determines whether the vehicle will roll over depending on the region where the point representing the actual values of the roll angle RA and roll angular rate RR of the vehicle falls. In addition, a predefined threshold line, which may be one of the threshold lines a, b, and c on the map of FIG. 4, is set on the map of the second rollover determination block 35.

The activation block 37 activates the occupant restraint device 10 of the vehicle depending on the determination results from either the first rollover determination block 36 or second rollover determination block 35. More specifically, when the signal from the trip-over determination block 38 indicates that an anticipated rollover of the vehicle has a pattern of trip-over, the activation block 37 uses the determination results from the first rollover determination block 36, otherwise uses that of the second rollover determination block 35.

Figure 2:
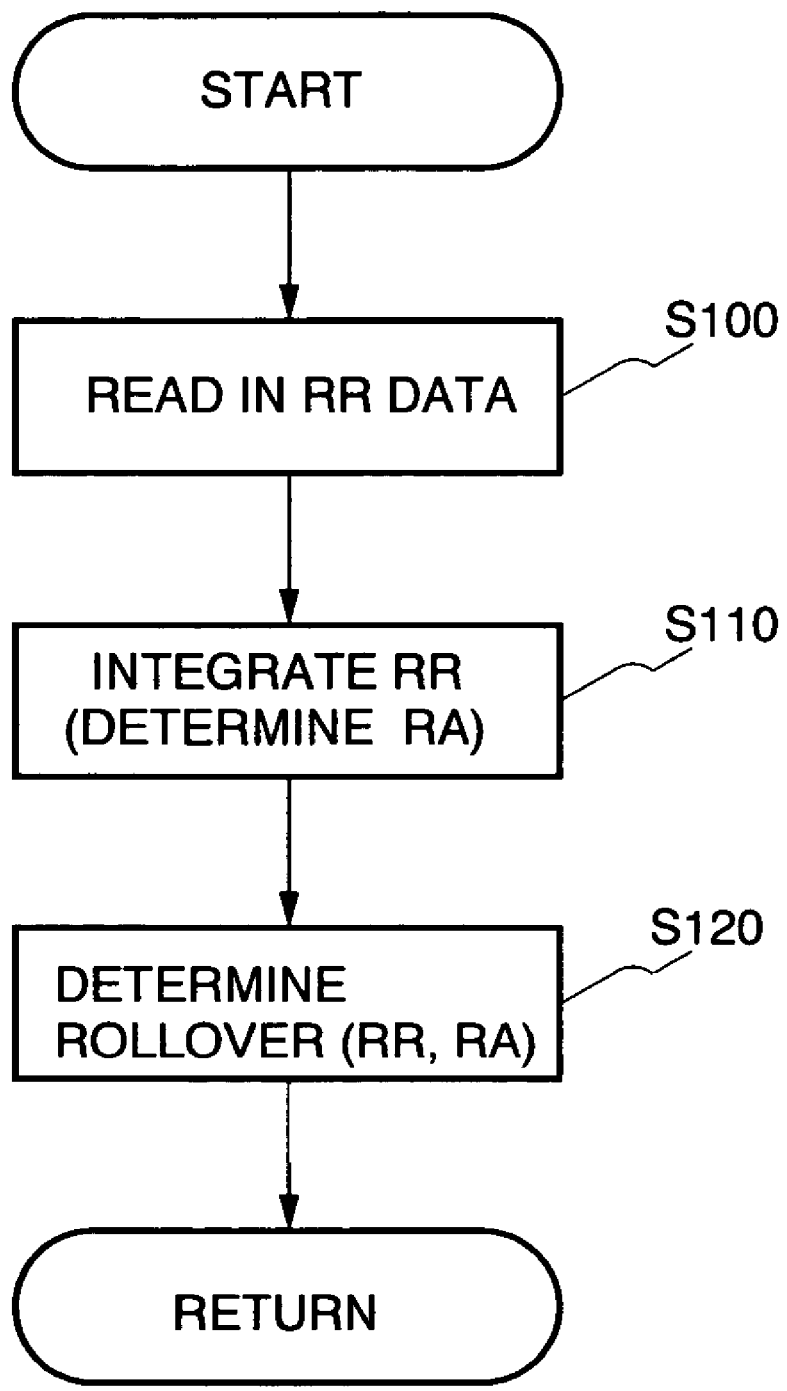
FIG. 2 is a flow chart illustrating a rollover determination process for activating the occupant restraint devices of the vehicle with the controller of FIG. 1A, when an anticipated rollover of the vehicle has a pattern of non-trip-over in connection with the embodiment of the present invention.
Figure 3:
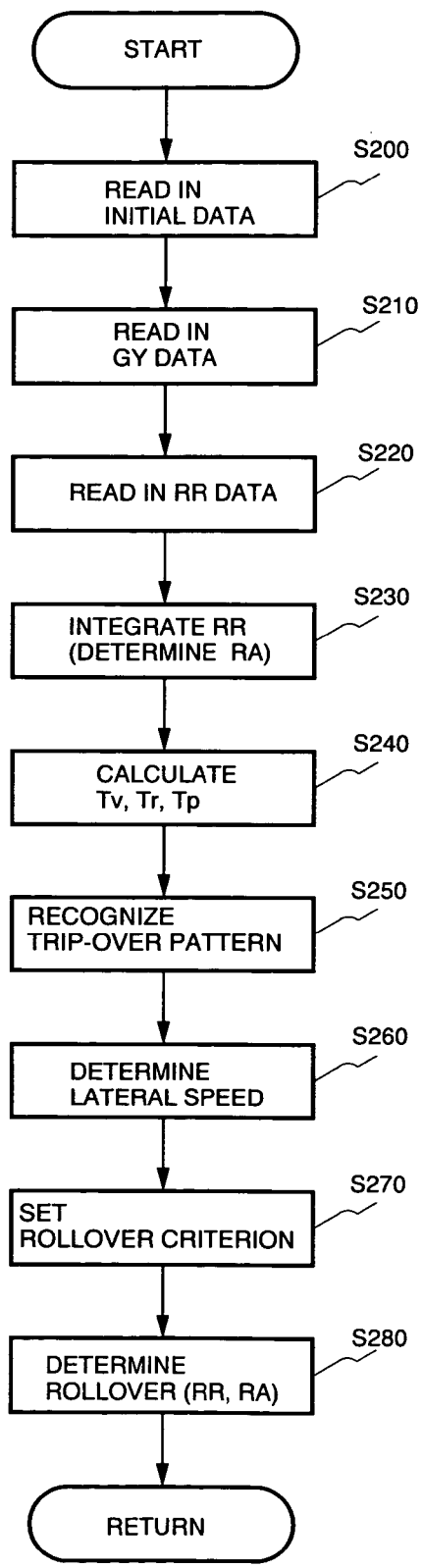
FIG. 3 is a flow chart illustrating a rollover determination process for activating the occupant restraint devices of the vehicle with the controller of FIG. 1A, when an anticipated rollover of the vehicle has a pattern of trip-over in connection with the embodiment of the present invention.

The rollover determination process of the controller 30 according to the embodiment of the present invention is described with the flow charts shown in FIGS. 2 and 3.

FIG. 2 shows the rollover determination process of the controller 30 for activating the occupant restraint device 10 of the vehicle when an anticipated rollover of the vehicle has a pattern of non-trip-over. At step S100 of FIG. 2, the roll angular rate RR of the vehicle is read in. Then at step S110, the roll angle RA of the vehicle is calculated by integrating the roll angular rate RR of the vehicle.

At step S120, using the map of the second rollover determination block 35, the anticipated rollover of the vehicle is determined depending on the region where the point representing the actual value of the roll angular rate RR of the vehicle read in at step S100 and the actual value of roll angle RA of the vehicle calculated at step S100 falls.

Based on the results of determination, the activation block 37 makes a decision of whether to activate the occupant restraint device 10 of the vehicle. More specifically, when the determination results indicate that the vehicle will roll over, the activation block 37 makes a decision to activate the occupant restraint device 10 of the vehicle.

On the other hand, FIG. 3 shows the rollover determination process of the controller 30 for activating the occupant restraint devices 10 of the vehicle when an anticipated rollover of the vehicle has a pattern of trip-over. At step S200 of FIG. 3, the initial values of parameters including the width W, the mass m, and the gravitational constant g are read in, and at step S210, the lateral acceleration GY of the vehicle is read in.

At step S220, the roll angular rate RR of the vehicle is read in, and at step S230, the roll angle RA of the vehicle is calculated by integrating the roll angular rate RR of the vehicle. At step S240, the translational energy Tv, rotational energy Tr, and potential energy Tp of the vehicle are calculated, and at step S250, the pattern of trip-over is recognized depending on characteristics of the lateral acceleration GY of the vehicle. At step S260, the lateral slip speed Vb of the vehicle prior to trip is calculated based on the translational energy Tv, rotational energy Tr, and potential energy Tp of the vehicle, and at step S270, an rollover determination criterion for the vehicle, which is the optimal threshold line here, is set depending on the recognized pattern of trip-over and the calculated lateral slip speed Vb of the vehicle prior to trip.

Then at step S280, using the map of FIG. 4 with the selected optimal threshold line, the anticipated rollover of the vehicle is determined depending on the region where the point representing the actual value of the roll angular rate RR of the vehicle read in at step S220 and the actual value of roll angle RA of the vehicle calculated at step 230 falls. Based on the results of determination, the activation block 37 makes a decision of whether to activate the occupant restraint device 10 of the vehicle. More specifically, when the determination results indicates that the vehicle will roll over, the activation block 37 makes a decision to activate the occupant restraint device 10 of the vehicle.

Accordingly, the apparatus of the embodiment of the present invention advantageously determines whether the vehicle will roll over based on an accurate recognition of the pattern of an anticipated rollover of the vehicle, so that the occupant restraint device 10 of the vehicle can be timely activated.

While the above particular embodiment of the invention has been shown and described, it will be understood by those who practice the invention and those skilled in the art that various modifications, changes, and improvements may be made to the invention without departing from the spirit of the disclosed concept. Such modifications, changes, and improvements within the skill of the art are intended to be covered by the appended claims.

What is claimed is:

1. An apparatus for activating an occupant restraint device of a vehicle, said apparatus comprising:
    a roll condition detector for detecting a roll condition of the vehicle;
    a lateral acceleration sensor for sensing a lateral acceleration of the vehicle in a width direction of the vehicle;
    a trip-over determination unit determining whether an anticipated rollover of the vehicle has a pattern of trip-over in response to both the lateral acceleration and the roll condition of the vehicle;
    a trip-over pattern recognition unit recognizing the pattern of trip-over based on the lateral acceleration of the vehicle, when the anticipated rollover of the vehicle has the pattern of trip-over;
    a rollover determination criteria unit setting a rollover determination criterion for the vehicle depending on the recognized pattern of trip-over;
    a rollover determination unit determining whether the vehicle will roll over based on both the roll condition of the vehicle and the rollover determination criterion for the vehicle; and
    an activation unit activating the occupant restraint device of the vehicle depending on a determined result from said rollover determination unit, the determined result being indicative of that the vehicle will roll over,
    wherein said trip-over pattern recognition unit recognizes the pattern of trip-over depending on a parameter selected from a set of parameters indicative of characteristics of the lateral acceleration of the vehicle, and
    wherein the set of parameters indicative of characteristics of the lateral acceleration of the vehicle includes a rate of the lateral acceleration of the vehicle in a rising stage thereof, a maximum value of the lateral acceleration of the vehicle, and a length of duration of the lateral acceleration of the vehicle.

2. The apparatus as set forth in claim 1 further comprising a lateral speed detector for detecting a lateral speed of the vehicle in the width direction of the vehicle, wherein said rollover determination criteria unit sets the rollover determination criterion for the vehicle based on the detected lateral speed of the vehicle prior to a rise of the lateral acceleration of the vehicle and the recognized pattern of trip-over.

3. The apparatus as set forth in claim 2, wherein said lateral speed detector determines the lateral speed of the vehicle prior to the rise of the lateral acceleration of the vehicle in terms of an amount of kinetic energy of the vehicle subsequent to the rise of the lateral acceleration of the vehicle, the kinetic energy of the vehicle consisting of a translational energy and a rotational energy of the vehicle.

4. The apparatus as set forth in claim 3, wherein said lateral speed detector determines the lateral speed of the vehicle prior to the rise of the lateral acceleration of the vehicle by further factoring in a potential energy of the vehicle subsequent to the rise of the lateral acceleration of the vehicle, the potential energy of the vehicle corresponding to the roll condition of the vehicle.

5. The apparatus as set forth in claim 4, wherein:
said roll condition detector further comprises a roll angular rate sensor for sensing a roll angular rate of the vehicle and a roll angle detector for detecting a roll angle of the vehicle;
said rollover determination unit further comprises a two-dimensional map on which the roll angle and roll angular rate of the vehicle are used as parameters and a threshold line is set to separate a rollover region and a non-rollover region, and said rollover determination unit determines whether the vehicle will roll over by applying actual values of the roll angle and roll angular rate of the vehicle to the two-dimensional map thereof; and
said rollover determination criteria unit sets a rollover determination criterion for the vehicle by adjusting the threshold line on the two-dimensional map of said rollover determination unit.

6. An apparatus for activating an occupant restraint device of a vehicle, said apparatus comprising:
a roll condition detector for detecting a roll condition of the vehicle;
a lateral acceleration sensor for sensing a lateral acceleration of the vehicle in a width direction of the vehicle;
a trip-over determination unit determining whether an anticipated rollover of the vehicle has a pattern of trip-over in response to both the lateral acceleration and the roll condition of the vehicle;
a trip-over pattern recognition unit recognizing the pattern of trip-over based on the lateral acceleration of the vehicle, when the anticipated rollover of the vehicle has the pattern of trip-over;
a rollover determination criteria unit setting a rollover determination criterion for the vehicle depending on the recognized pattern of trip-over;
a rollover determination unit determining whether the vehicle will roll over based on both the roll condition of the vehicle and the rollover determination criterion for the vehicle;
an activation unit activating the occupant restraint device of the vehicle depending on a determined result from said rollover determination unit, the determined result being indicative of that the vehicle will roll over; and
a lateral speed detector for detecting a lateral speed of the vehicle in the width direction of the vehicle, wherein said rollover determination criteria unit sets the rollover determination criterion for the vehicle based on the detected lateral speed of the vehicle prior to a rise of the lateral acceleration of the vehicle and the recognized pattern of trip-over.

7. The apparatus as set forth in claim 6, wherein said lateral speed detector determines the lateral speed of the vehicle prior to the rise of the lateral acceleration of the vehicle in terms of an amount of kinetic energy of the vehicle subsequent to the rise of the lateral acceleration of the vehicle, the kinetic energy of the vehicle consisting of a translational energy and a rotational energy of the vehicle.

8. The apparatus as set forth in claim 7, wherein said lateral speed detector determines the lateral speed of the vehicle prior to the rise of the lateral acceleration of the vehicle by further factoring in a potential energy of the vehicle subsequent to the rise of the lateral acceleration of the vehicle, the potential energy of the vehicle corresponding to the roll condition of the vehicle.

9. The apparatus as set forth in claim 6, wherein:
said roll condition detector further comprises a roll angular rate sensor for sensing a roll angular rate of the vehicle and a roll angle detector for detecting a roll angle of the vehicle;
said rollover determination unit further comprises a two-dimensional map on which the roll angle and roll angular rate of the vehicle are used as parameters and a threshold line is set to separate a rollover region and a non-rollover region, and said rollover determination unit determines whether the vehicle will roll over by applying actual values of the roll angle and roll angular rate of the vehicle to the two-dimensional map thereof; and
said rollover determination criteria unit sets a rollover determination criterion for the vehicle by adjusting the threshold line on the two-dimensional map of said rollover determination unit.

* * * * *